Aug. 6, 1935.  J. B. GURY, JR  2,010,514
CLOTH CUTTING MACHINE
Filed Nov. 3, 1934  3 Sheets-Sheet 2
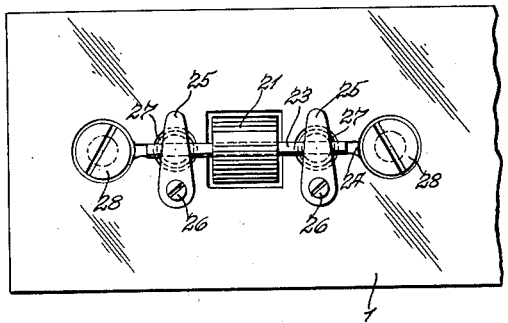
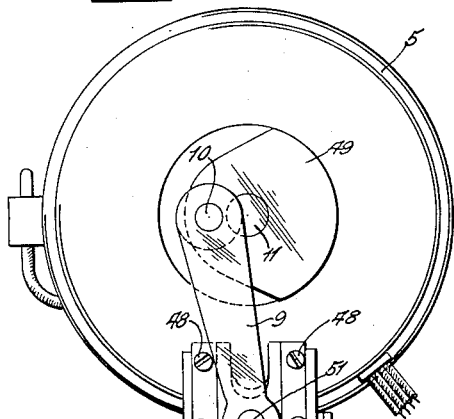
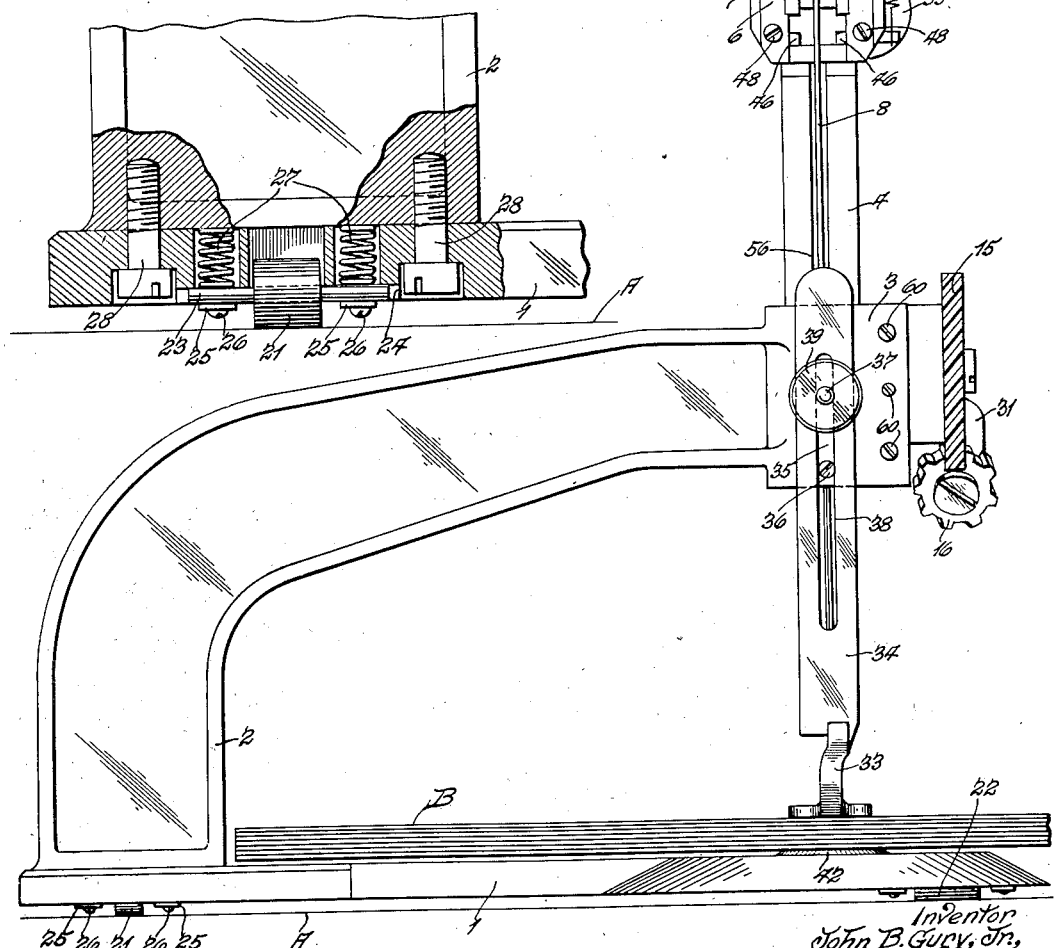

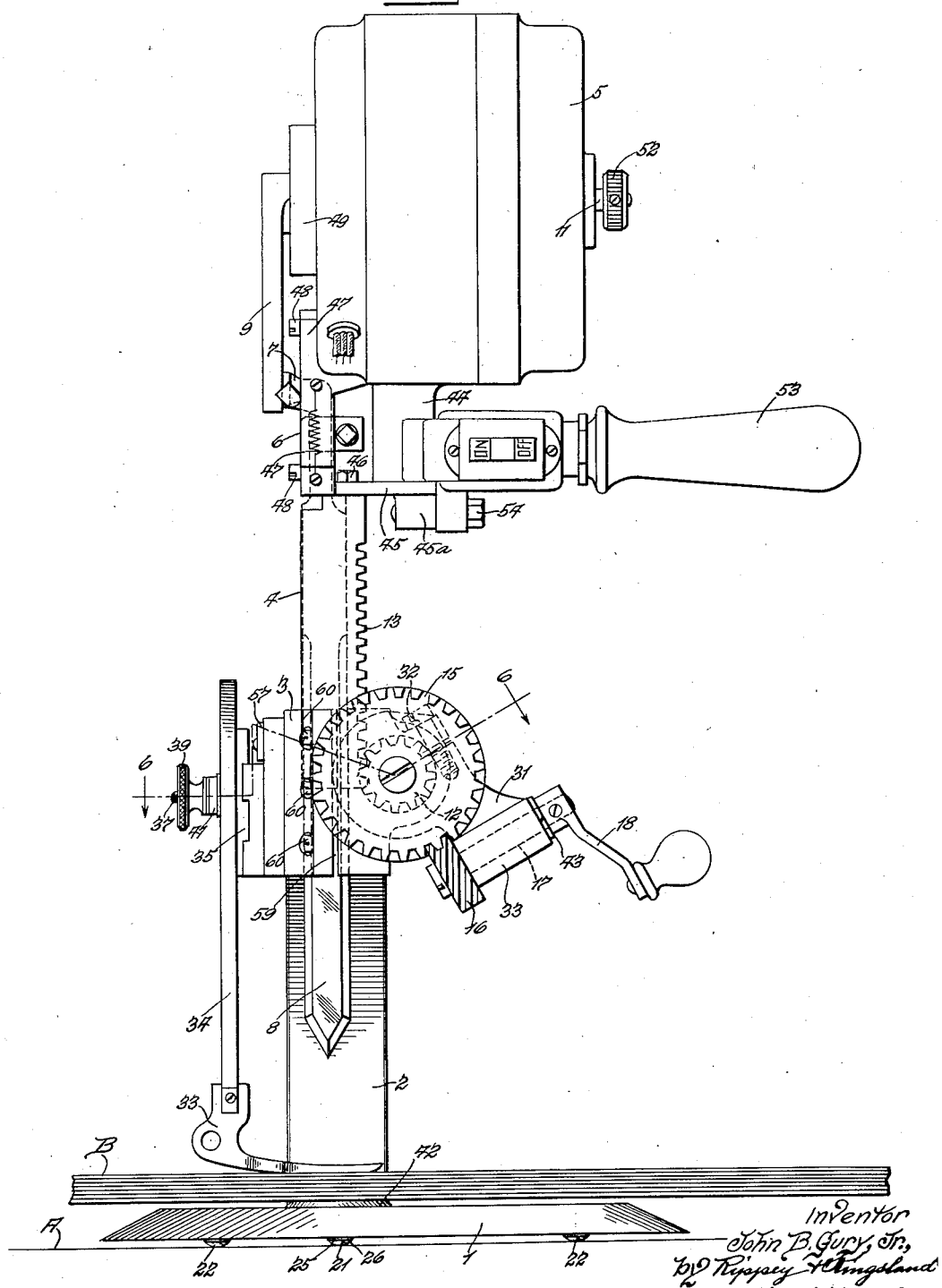

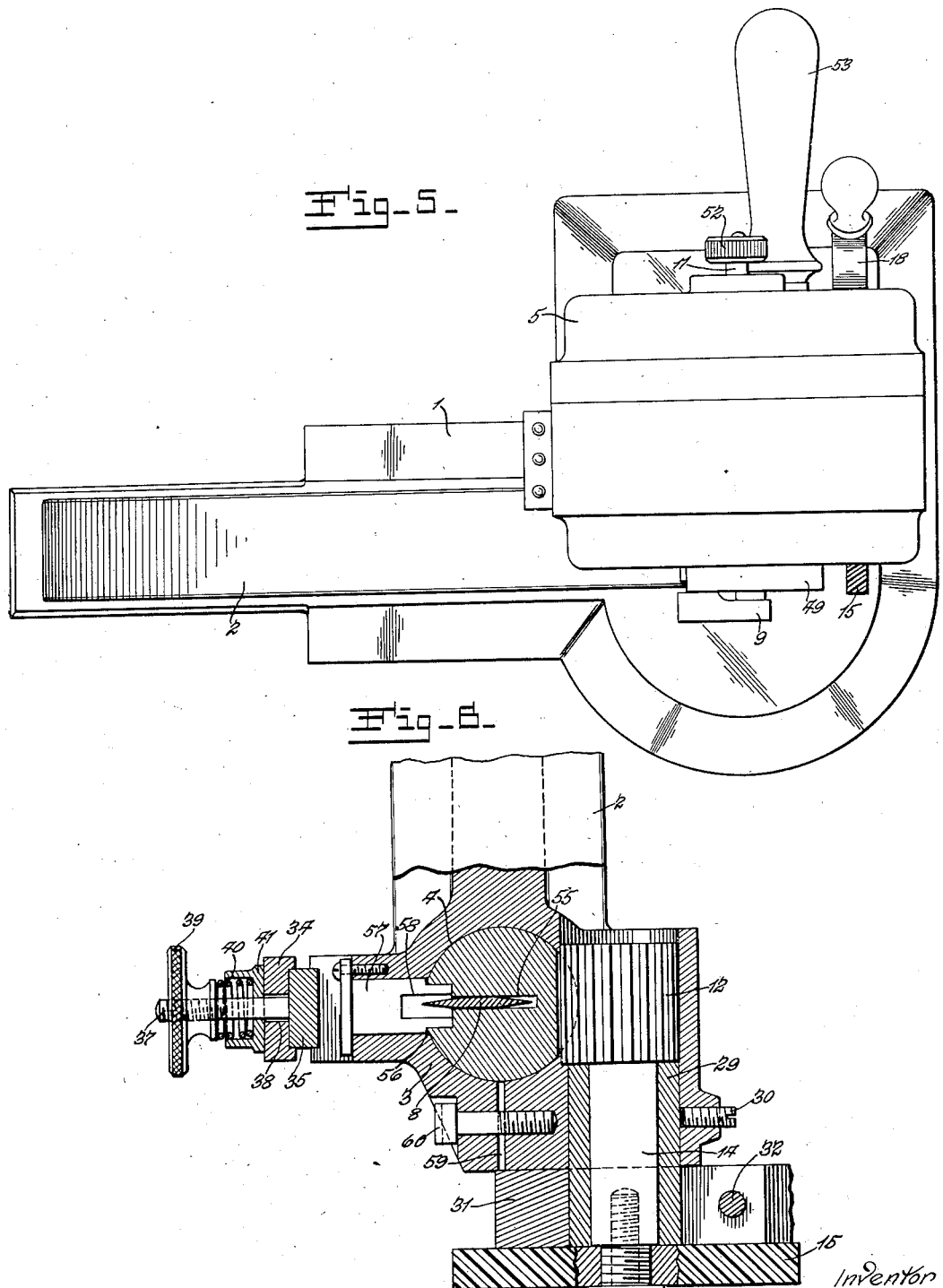

Patented Aug. 6, 1935

2,010,514

UNITED STATES PATENT OFFICE 2,010,514

CLOTH CUTTING MACHINE

John B. Gury, Jr., St. Louis, Mo., assignor to J. B. Gury Mfg. Co., St. Louis, Mo., a corporation of Missouri Application November 3, 1934, Serial No. 751,270

15 Claims. (Cl. 164—75)

This invention relates to a cloth cutting machine of the type used in cutting a stack of cloth in which a series of superimposed layers comprise the stack, and in which the cutter is moved along a table upon which the stack is placed.

With cloth cutting machines of this type, which employ a reciprocating knife, it has hereto been impossible to make a cut within the margin of the goods. That is to say, a machine would only operate successfully where the cut started from an edge of the goods. An object of this invention is to provide an improvement in a machine employing a reciprocating knife whereby a cut can be started within the margin of the goods without the necessity of commencing the cut from the margin or edge.

Another object of the invention is to provide, in a machine of the character described, means for raising the motor and reciprocating mechanism, and thereby the lower end of the knife, with reference to the base of the machine.

Other and specific objects will be apparent from the following detail description, taken in connection with the accompanying drawings.

Fig. 1 is an elevation of a machine embodying the invention at a right angle to the direction of its movement in cutting;

Fig. 2 is an elevation of the machine in line with the direction of cutting movement;

Fig. 3 is a view showing the details of construction of one of the rollers, upon which the base is mounted;

Fig. 4 is an elevation partly in section showing further details of the construction illustrated in Fig. 3;

Fig. 5 is a plan view of the machine; and

Fig. 6 is a detail taken approximately on line 6—6, Fig. 1.

The embodiment of the invention, specifically illustrated in the drawings, includes a base 1 supporting an overhanging arm or bracket 2, which has at its outer end a head 3 adjustably supporting a pedestal or post 4, which carries at its upper end a motor 5 and guides 6. A cross-head 7, to which a cutting knife or blade 8 is clamped, is positioned for reciprocation in the guides by a pitman 9 pivoted on a crank pin 10, which is attached to a crank 49 on the shaft 11 of the motor. The knife 8 extends downward from the cross-head 7 through an appropriate longitudinal slot 55 in the pedestal, and has an exposed saber point so that it may pierce by thrusting as well as cut along a longitudinal edge. The pedestal or post 4 may be raised or lowered as desired by a gear 12 which meshes in a rack 13 formed on one face of the pedestal. The gear 12 is secured to a shaft 14, to which is also attached a gear 15 driven by a helical pinion 16 positioned at a right angle thereto. The pinion 16 is attached to a shaft 17 which may be turned by a crank 18. The shaft 14 is journalled in a sleeve 29, and a bracket 31, which supports the shaft 17, is adjustably supported on the outer end of the sleeve 29. A resilient split washer 43 about the shaft 17 and adjacent the crank 18 acts as a detent, which with the friction between the angularly disposed gear 15 and pinion 16 serves to maintain the pedestal in any selected vertical position.

The foregoing constitutes a summary description while the essential features of the invention are pointed out in the appended claims. A more detailed description of the invention and of the specific embodiment illustrated in the drawings now follows.

The base 1 is a relatively low member elevated at a slight distance above a surface A upon which it is intended to operate, that is, the table or bench upon which plies of fabric B are laid. The base is supported by the roller 21 positioned at one end of the base 1, as shown in Figs. 3 and 4, and by a pair of rollers 22 at the other end of the base.

The roller 21 is mounted on a shaft 23, which is positioned in a longitudinal socket 24 in the base. The shaft 23 is held in position by clips 25 secured to the underside of the base 1 by screws 26. Springs 27, positioned in appropriate sockets in the base, bear against the shaft 23 to prevent rattling or chattering. The roller 21 is positioned adjacent the bottom of the bracket 2 which is secured to the base 1 by screws 28.

As previously explained the arm or bracket 2 overhangs the base and carries at its outer end a boss or block 3, in which the pedestal 4 is journalled for vertical adjustment. The shaft 14, to which is attached the gear 12 meshing with the rack 13 on the post 4, is mounted for rotation in a sleeve 29 held in an appropriate socket in the block 3 by a set screw 30.

A bracket 31 is secured to the sleeve 29 by a screw 32. At its outer end the bracket 31 carries a boss 33, in which is journalled the shaft 17, carrying at one end the pinion 16, which drives the gear 15, and at its other end the crank 14.

It will now be understood that upon turning the crank 18 the pinion 16 will drive the gear 15 and with it the gear 12 to raise or lower the pedestal 4. This changes the vertical position of the reciprocating mechanism carried at the top of the pedestal and also raises or lowers the knife 8.

The peculiar arrangement of the bracket 31 with reference to the sleeve 29 permits its adjustment by loosening the screw 32 so that it, with the crank 18, can be adjusted to a variety of different positions to suit the convenience of the operator. That is to say, the bracket 31 is split, as shown in dotted lines in Fig. 1 and as shown in detail on Fig. 6, so that by loosening the screw 32 the bracket 31 may readily be moved to any selected position about the sleeve 29.

The block 3 carries an adjustable pressure foot 33, which is supported at the lower end of a stem 34. An angular guide piece 35 is secured by a screw 36 to the block 3 and fits in an appropriate groove on the inner side of the stem 34. The block 3 has a stud 37 projecting outwardly from it through the piece 35 and through an appropriate slot 38 in the stem 34. The stem 34 may be held in any adjusted position by means of a thumb nut 39 on the stud 37, a spring 40 and a washer 41 being interposed between the nut 39 and the outer face of the stem 34, as best shown in Fig. 6. It will thus be seen that the foot 33 may be selectively positioned to accommodate various depths of fabric.

It will be understood, in accordance with the practice in the art that the pressure foot 32 has an appropriate groove to accommodate the knife 8 and also that a groove is placed in a section 42 in the base, this permitting an adjustment of the device so that the knife may extend through the base in its movement.

A split resilient washer 43 is positioned between the boss 33 on the bracket 31 and the crank 18 in order to provide a detent. Thus, when the elevation of the pedestal 4 is set at any particular place the friction between the gears 15 and 16 and the action of the detent washer 43 is sufficient to hold the device in that adjusted position.

The particular construction of the motor and the reciprocating mechanism is no part of this invention except by way of proper combination, but a brief description will be made in order to explain the operation of the device. The frame of the motor 5 has a vertical lug 44, to which is integrally connected a horizontal piece or plate 45 and the motor is connected to the top of the pedestal 4 by means of screws 46 passing through the plate 45 and into the top of the pedestal 4. The frame of the motor is integral also with a vertically extending portion or housing 47 in which are positioned the guide members 6 by means of screws 48. The crosshead 7 is mounted for reciprocation in the vertical guides 6.

The shaft 11 of the motor has a counterbalanced crank 49 carrying the crank pin 10, upon which is pivotally mounted one end of the pitman 9 which has its other end connected to the cross-head 7 by a pin 51. A knob 52 is attached to the rear end of the motor shaft 11, whereby the position of the shaft and the position of the knife can be manually adjusted when the motor is out of circuit.

A handle 53, by which the device may be moved, is secured to the frame members 44 and 45 by means of screws 54 only one of which is shown in the drawings, the plate 45 having a downwardly extending lug or boss 45a into which the screws 54 extend.

The pedestal 4 has a groove 55 throughout its entire length to accommodate the knife 8. This groove acts both as a guide and as a guard for the knife. By reason of economy in manufacture the pedestal 4 is circular and to prevent its rotation it has a spline 56 in which the end of a pin 57 engages. The pin 57 has a groove 58 to accommodate the edge of the knife. These details are best shown in Fig. 6.

The boss 3 is split as shown at 59, Figs. 1 and 6, and the adjacent parts are held together by screws 60, which may be adjusted to take up wear.

One of the uses of the improved machine is to cut slits in cloth for pockets of a garment. It has particular utility, of course, where any cut is desired which is internal of the margin of the goods and where the cut is not desired to run from the edge.

In operating the device, a stack of fabric is laid upon a table, the pedestal is elevated so that the lower point of the knife 8 may clear the fabric and the base 1 is inserted underneath the fabric. Ordinarily the pattern will be sketched on the top layer of fabric, and when the machine is moved to the proper place, with the pile of fabric overlying the base 1, the knob 52 is rotated so that the machine and the knife may be accurately positioned. The motor is then turned on and the handle 18 is turned gradually to lower the knife and until the entire pile of fabric is pierced. The machine is then moved on the table along the line to be cut in the conventional manner. When the cut is completed the motor is turned off and the mechanism is raised by the crank 18 and the machine removed.

As previously explained, different operators prefer the crank 18 differently positioned and to accommodate this preference the screw 32, which clamps the bracket 31 in place, may be loosened and the crank assembly may then be moved to any desired position when the screw 32 is again tightened.

It will be obvious that various changes may be made in the details of construction, within the scope of the appended claims, without departing from the spirit of this invention, and that parts of the invention may be used without the whole.

I claim:

1. In a cloth cutting machine the combination including a base movable along a table underneath a pile of cloth, a bracket supported by and overhanging the base, a pedestal slidably mounted in the bracket, a cutting tool and reciprocating mechanism therefor supported by the pedestal, and manually operating mechanism associated with the bracket for adjusting the elevation of the pedestal.

2. In a cloth cutting machine the combination including a base movable along a table underneath a pile of cloth, a bracket supported by and overhanging the base, a pedestal slidably mounted in the bracket, a cutting tool and reciprocating mechanism therefor supported by the pedestal, manually operating mechanism associated with the bracket for adjusting the elevation of the pedestal, and detent mechanism for maintaining the pedestal in adjusted position.

3. In a cloth cutting machine the combination including a base movable along a table underneath a pile of cloth, a bracket supported by and overhanging the base, a pedestal slidably mounted in the bracket, a cutting tool and reciprocating mechanism therefor supported by the pedestal, mechanism for adjusting the elevation of the pedestal including a rack on the pedestal, a gear meshing with the rack and secured to a shaft supported by the bracket, and manually operable means for driving the shaft.

4. In a cloth cutting machine having a base movable along a table underneath a pile of cloth, a bracket supported by the base and a pedestal slidably mounted in the bracket and supporting a knife and reciprocating mechanism therefor, the combination comprising mechanism for adjustably positioning the pedestal in the bracket including a rack on the pedestal, a pinion engaging the rack, a shaft for driving the gear, a sleeve for the shaft supported by the bracket, and means adjustably supported on the sleeve for rotating the shaft.

5. In a cloth cutting machine having a base movable along a table underneath a pile of cloth, a bracket supported by the base and a pedestal slidably positioned in the bracket and supporting a knife and reciprocating mechanism therefor, the combination comprising mechanism for adjustably positioning the pedestal on the bracket including a rack on the pedestal, a shaft supported by the bracket and having on one end a pinion engaging the rack, a helical gear and helical pinion at an angle to each other for driving the shaft, and a crank for manual engagement to rotate said helical pinion.

6. In a cloth cutting machine the combination including a base movable along a table underneath a pile of cloth, a bracket supported by and overhanging the base, a pedestal slidably mounted in the bracket, reciprocating mechanism supported by the bracket, a cutting blade supported by said reciprocating mechanism and mounted in a slot in the pedestal, and manually operable mechanism associated with the bracket for adjusting the elevation of the pedestal.

7. In a cloth cutting machine the combination including a base movable along a table underneath a pile of cloth, a bracket supported by and overhanging the base, a pedestal slidably mounted in the bracket, reciprocating mechanism supported by the bracket, a blade supported by said reciprocating mechanism and having a piercing point and a cutting edge, and manually operable mechanism associated with the bracket for adjusting the elevation of the pedestal and thereby the lower limit of the blade.

8. In a cloth cutting mechanism, a base, a bracket mounted on and overhanging the base, a pedestal slidably mounted on the bracket, a cutter reciprocably mounted on the pedestal, and a pressure foot device mounted on the bracket and adjustable toward and from the base.

9. In a cloth cutting machine, a base, a pedestal, means mounting the pedestal on the base for reciprocation toward and from the same, a cutter blade, a cut-out in the pedestal to receive the cutter and provide a guard therefor, and means for preventing the pedestal from turning about its axis, but permitting its axial reciprocation.

10. In a cloth cutting machine, a base, an overhanging bracket mounted thereon, a pedestal reciprocably mounted in the bracket, a cutter, means in the pedestal to receive the cutter and to completely house the same, save for the projection of the cutter for cutting purposes, and means for reciprocating the pedestal and hence the cutter, toward the base.

11. In a device of the kind described, a base, a pedestal, means for reciprocably mounting the pedestal on the base, means for reciprocating the pedestal, including a rotatable handle, structure transforming the rotation of the handle into reciprocation of the pedestal, and means mounting the handle on the base so that it may be adjusted to a suitable angular position relative to the base.

12. In a device of the kind described, a base, a pedestal, means reciprocably mounting the pedestal on the base, said means including a bracket fixed to the base and supporting the pedestal, means for reciprocating the pedestal in the bracket including a shaft, interengaging means on the shaft and pedestal for moving the latter upon rotation of the former, and means for mounting the shaft on the pedestal for oscillation thereabout without disengaging the interengaging means.

13. In a device of the kind described, a reciprocable member, a support upon which the reciprocating member is mounted, a crank, means interengaging the crank and the reciprocating member for reciprocation of the latter upon rotation of the crank, said interengaging means including a shaft, a bracket upon which the crank is mounted, said bracket being rotatable about said shaft to adjust the position of the crank.

14. In a device of the kind described, a supporting element, a reciprocating member, means to reciprocate the member upon the element including a shaft, a crank, gearing between the shaft and the crank, a bracket mounted on the supporting element and in which the crank is mounted, said bracket being rotatable about said shaft whereby to adjust its angular relation to the supporting element without disengaging said gearing.

15. In a device of the kind described, a supporting element, a reciprocating member, means to reciprocate the member upon the element including a shaft, a crank, gearing between the shaft and the crank, a bracket mounted on the supporting element and in which the crank is mounted, said bracket being rotatable about said shaft whereby to adjust its angular relation to the supporting element without disengaging said gearing, together with friction means between said shaft and said bracket to hold said crank in adjusted position relative to the bracket.

JOHN B. GURY, Jr.